(12) United States Patent
Llorente Gonzalez

(10) Patent No.: US 8,123,207 B2
(45) Date of Patent: Feb. 28, 2012

(54) NACELLE LIFTING TOOL AND METHOD

(75) Inventor: Jose Ignacio Llorente Gonzalez, Sarriguren Navarra (ES)

(73) Assignee: Gamesa Innovation & Technology, S.L., Sarriguren Navarra (ES)

( * ) Notice: Subject to any disclaimer, the term of this patent is extended or adjusted under 35 U.S.C. 154(b) by 961 days.

(21) Appl. No.: 12/083,522

(22) PCT Filed: Oct. 27, 2006

(86) PCT No.: PCT/ES2006/000596
§ 371 (c)(1),
(2), (4) Date: Apr. 11, 2008

(87) PCT Pub. No.: WO2007/051880
PCT Pub. Date: May 10, 2007

(65) Prior Publication Data
US 2009/0179372 A1    Jul. 16, 2009

(30) Foreign Application Priority Data

Oct. 27, 2005  (ES) .................................. 200502616

(51) Int. Cl.
  B23Q 3/00    (2006.01)
  B25B 11/00   (2006.01)
  F03D 7/06    (2006.01)
  F01D 5/18    (2006.01)
  B66F 3/00    (2006.01)

(52) U.S. Cl. ............. 269/319; 269/21; 269/32; 415/4.2; 416/1; 254/134

(58) Field of Classification Search .................. 269/319, 269/21, 32; 415/4.2; 52/745.18
See application file for complete search history.

(56) References Cited

U.S. PATENT DOCUMENTS

| 4,271,578 | A   |   | 6/1981  | Robinson et al. |
| 5,293,961 | A   | * | 3/1994  | Postema ........................ 144/349 |
| 5,301,869 | A   | * | 4/1994  | Toyooka et al. .............. 228/147 |
| 6,546,616 | B2  | * | 4/2003  | Radowick ....................... 29/720 |
| 7,584,809 | B1  | * | 9/2009  | Flud .............................. 175/162 |
| 7,654,790 | B2  | * | 2/2010  | Molbech .......................... 415/1 |
| 2005/0196280 | A1 |   | 9/2005  | Gonzalez et al. |
| 2009/0202350 | A1 | * | 8/2009  | Pedersen .................. 416/146 R |
| 2009/0280010 | A1 | * | 11/2009 | Pederson ........................ 416/1 |

FOREIGN PATENT DOCUMENTS

| ES | 2 217 034  | 11/2004 |
| GB | 2 177 374  | 1/1987  |
| JP | 2004-11588 | 1/2004  |

OTHER PUBLICATIONS

English abstract of JP 2004-11588 dated Jan. 15, 2004.

* cited by examiner

Primary Examiner — Lee D Wilson
Assistant Examiner — Alvin Grant
(74) Attorney, Agent, or Firm — Ladas & Parry LLP

(57) ABSTRACT

A nacelle lifting tool and method for lifting the nacelle of a wind generator in relation to the rotating ring. The inventive tool is formed by first and second fixing devices which replace brake callipers that are disposed on front and rear lifting devices. The aforementioned lifting devices are supported by supports which are fixed in the form of braces to the vertices of a regular polygon formed by beams. The inventive method consists in removing the brake callipers in order to install the fixing devices in an alternating manner and fixing said devices vertically. The first and second fixing devices include rear and front callipers and the lifting devices include hydraulic jacks.

13 Claims, 3 Drawing Sheets

NACELLE LIFTING TOOL AND METHOD

FIELD OF THE INVENTION

This invention refers to a tool for lifting a nacelle of a wind generator which enables access, maintenance and improvement of the wind generator rotating systems, without requiring elements external to the wind generator.

In addition, the invention refers to the lifting method which serves to lift the hub and the nacelle, in order to perform maintenance and improvement tasks: enabling the exit of the axial slide plates of the rotating system, together with access to the free area between the frame and the rotating ring for cleaning and greasing purposes.

STATE OF THE ART

The sector to which the invention belongs is the wind generator maintenance sector, particularly the maintenance of the rotating system which enables the rotation of the nacelle and the hub in order to orient it towards the direction of the wind, thus taking full advantage of its energy.

The rotating ring, on the axial and radial surfaces which make contact with the nacelle, has a series of anti-friction elements which on one hand allow the transmission of stresses to the rotating ring and from there to the tower, and on the other decrease the friction between the nacelle and the rotating ring to facilitate the rotation of the nacelle for better orientation purposes.

These elements require a certain amount of maintenance and continuous improvement to adapt them to the state of the art. For this purpose the nacelle needs to be separated from the rotating ring.

There are various methods for separating the nacelle form the rotating ring and from the tower:

The first methods use an external crane of great height. These methods have the great inconvenience of requiring heavy and costly machinery, and a lot of operation time to locate the crane beside the wind generator.

Other methods to perform maintenance are described in U.S. Pat. No. 4,311,434, U.S. Pat. No. 6,408,575, WO03100248, and in document JP2004011588.

The latter of these documents is the most similar to this invention. JP2004011588 describes a method for separating the nacelle from the tower and allowing the rotation of said nacelle. To do so it locates an annular piston inside a chamber that is also annular. When oil or air is inserted under pressure into the chamber, the piston joined to the nacelle is lifted and can rotate. If the pressure is insufficient, the nacelle lowers and the friction of the piston with the bottom of the chamber secures the nacelle. This method does not serve for maintenance purposes, given that if access to the chamber is required, when it the chamber is opened pressure would be lost and the nacelle would descend, thus closing the chamber.

DESCRIPTION OF THE INVENTION

This invention refers to a nacelle lifting tool and to the method with which it is applied to wind generators.

A first aspect of the invention refers to a nacelle lifting tool that enables the lifting of a wind generator nacelle, supported by the shaft of a hub, and the separation of said nacelle from the rotating ring joined to a wind generator tower.

Throughout this report, the front part of the wind generator shall be considered as the part closest to the hub of the wind generator, regardless of the type of wind generator (whether with windward or leeward rotor). Equally, the rear part of the wind generator shall be considered as the part furthest away from said wind generator hub.

The tool of the invention comprises a plurality of beams, preferably straight, that are secured to the tower at a plurality of points distributed on an internal surface of the tower close to the rotating ring. At least three beams must be used, forming a horizontal polygon in order to compensate all the overturning moments to which the nacelle may be subjected.

Some supports are secured to these beams in the vertices of the polygon, resembling braces, which serve as a support to some front and rear lifting means. As an example of lifting means that are validated for the invention we could mention hydraulic or pneumatic jacks, or mechanical means such as a jack.

On a higher plane, and vertically aligned with each lifting device, and therefore above each support, some first and second nacelle fixing means are located. These first and second fixing means can be moved in a vertical direction by the front and rear lifting means, in order to move the nacelle in said vertical direction.

One embodiment of the front and rear lifting means comprises a plurality of front and rear hydraulic jacks, the shafts of which move in a vertical direction, making contact with the lower surface of the fixing means and moving them in the aforementioned vertical direction.

This embodiment may be optimised by making the shafts pass through the supports by means of through holes made in them. Ideally, these holes shall be made in a central position to appropriately distribute the stresses on the support and on the beams that support it.

If, for any reason, the centre of gravity of the nacelle and hub unit is not aligned with the centre of the polygon, the front and rear fixing means will support different loads. For this reason, it is possible for said first and second fixing means, and also the front and rear lifting means, to be different.

According to an example embodiment, the polygon is a triangle which comprises three beams, three supports, three hydraulic jacks, two front callipers and one rear calliper that are located at the vertices of the triangle.

In this case, the first fixing means comprise at least two front callipers whilst the second fixing means comprise at least one rear calliper. This rear calliper will be placed at the point furthest away from the hub. Should various callipers be used, they will be distributed on the points furthest away from the hub.

The rear hydraulic jacks can be located below these second fixing means, said jacks may be double effect in order to create traction or compression forces depending on the overturning moment to be compensated by the fixing means.

Due to the triangle shape, the distribution of stresses will be simple and any overturning moment to which the nacelle is subjected can easily be compensated, whether due to the misalignment of the centre of gravity of the hub and nacelle unit, due to the wind or due to any other reason.

According to one form of embodiment, the front and rear callipers are formed by a portion of a ring with an L shaped section, to define a seat, which on the surface of the horizontal side of the seat has a plurality of vertical shims, two for example, which allow relative movement of the calliper and the rotating ring. Means for fixing the calliper to the nacelle are located on a surface of the vertical side of the seat, along with at least one horizontal shim which enables the transmission of horizontal stresses from the calliper to the rotating ring.

If required, the descent of the callipers of the rotating system can be further facilitated by including some trays joined to the middle sections of the beams on one end, and to the tower on the other end. For example, they can be joined to the base of the rotating ring by means of a fastening pin or other method.

A second aspect of the invention refers to a method for lifting the nacelle, separating said nacelle from the rotating ring.

Generally, nacelles are secured to the rotating ring by means of a plurality of brake callipers. These brake callipers secure the nacelle to the rotating ring in a manner that prevents separation.

They must therefore be replaced by the front and rear fixing means, avoiding the removal of all brake callipers at the same time.

The nacelle lifting method comprises a first phase which is not new (stage a) where the rotation of the nacelle on the rotating ring is prevented.

In addition, it comprises the following new phases:

Stage b): progressive replacement of at least one brake calliper with the second fixing means. Said brake calliper shall be located in a position opposite the wind generator hub. In cases where various second fixing means are located, they shall be placed symmetrically to the shaft of the hub.

Followed by, stage c), at least two brake callipers are replaced with first fixing means. The brake callipers replaced in stages b) and c) shall be distributed, on the rotating ring forming a regular polygon, with said form not mandatory but recommended.

Subsequently, in a stage d), a plurality of beams is installed, such as to form a closed polygon, the vertices of which are placed on an internal surface of the tower and are radially aligned with the first and second fixing means. These beams may comprise calliper support elements, such as a plurality of trays joined to the middle sections of the beams at one end, and to the tower at the other end.

The method then continues to stage e) where, in the area around the vertices, a plurality of supports are located as a form of braces, which will serve in subsequent stage f) for fixing some front and rear lifting means, such as, hydraulic or pneumatic jacks.

The vertices must be aligned with the fixing means, given that the lifting means must be vertically aligned with the fixing means. The first fixing means shall be aligned with the front lifting means, whilst the second lifting means shall be aligned with the rear fixing means.

Once the fixing and lifting means are located, the method continues to stage g) where the remaining brake callipers are removed, allowing the vertical movement of the nacelle in relation to the rotating ring.

Finally, in stage h), the lifting means are acted upon which in turn act upon the fixing means in order to lift the nacelle from the rotating ring.

According to a second embodiment of this method, the front and rear lifting means respectively, are front and rear hydraulic jacks with shafts that are supported on the lower surface of the first and second fixing means.

Said fixing means may comprise a plurality of callipers. At least one rear calliper will be used on the second fixing means, and two rear callipers on the first fixing measure.

For possible misalignments of the centre of gravity of the nacelle and hub unit, double effect rear hydraulic jacks are recommended, thus enabling them to act in both directions and compensate any overturning moment.

DESCRIPTION OF THE DRAWINGS

The following figures are included for a better understanding of the invention.

DESCRIPTION OF AN EMBODIMENT

Briefly described below is an embodiment of the invention which is provided for illustration purposes and therefore not limited to the same.

Figure 1:
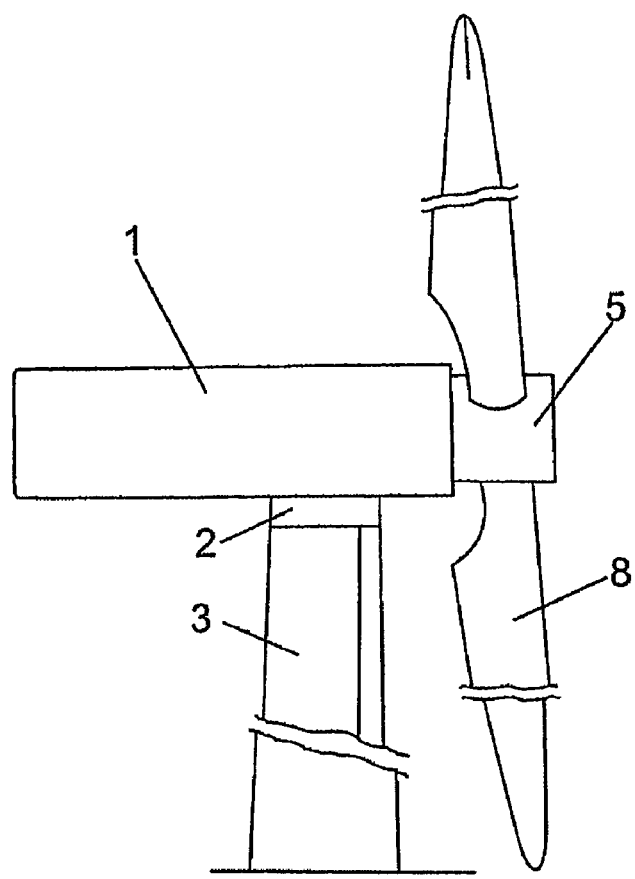
FIG. 1: General view of a wind generator.

FIG. 1 shows a nacelle (1) of a wind generator which turns on itself supported on a rotating ring (2) located on the top of a tower (3) of a wind generator. In this manner the hub (5) can be placed opposite the wind and the blades (8) of the wind generator can take full advantage of the wind power.

The nacelle (1) is supported on the rotating ring (2) by means of a series of brake callipers (4) which make contact with plates of anti-friction material such as teflon, and are arranged transversally to the axis of the tower to prevent friction between the nacelle (1) and the rotating ring (2), said plates are often referred to as the axial PETP's (6), and some similar plates that are curved and located parallel to the rotation axis of the nacelle (1), called radial PETP's (7). Both PETP's (6, 7) must be changed during wind generator maintenance.

Figure 2:
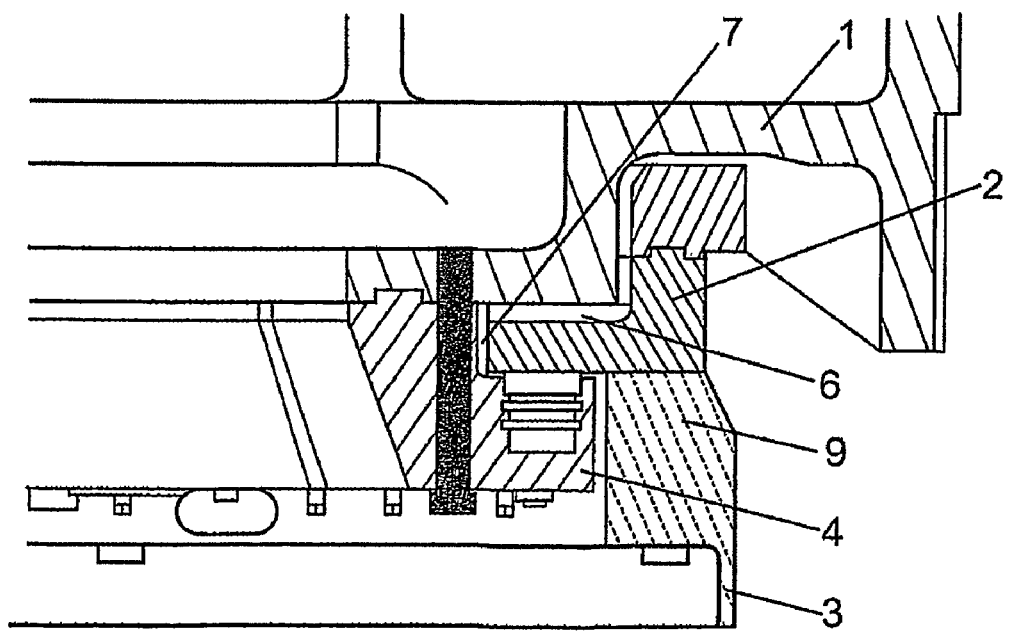
FIG. 2: Detail of the fixing of a nacelle to the rotating ring and the radial and axial PETP's.

These elements are shown in FIG. 2 that shows a detailed view of the fixing of the nacelle (1) to the rotating ring (2).

Due to the friction of the nacelle (1) upon the rotating ring (2), these PETP's (6, 7) are worn away, as are other elements of the contact between the nacelle (1) and the rotating ring (2), and they therefore require certain maintenance and greasing. Equally, it may be advantageous to replace these PETP (6, 7) for other more technically advanced versions.

The nacelle (1) and the rotating ring (2) need to be separated in order to access the contact zone, and the method of the invention offers an appropriate method for doing so.

One embodiment of the nacelle (1) lifting tool of this invention consists of first and second fixing means that are located to replace various brake callipers (4) and are acted upon in order to lift the nacelle. The second fixing means are located to replace at least one brake calliper (4) on a point far away from the hub (5) whilst the first fixing means are secured to the nacelle (1) at points of contact with the rotating ring (2) close to the hub (5).

Figure 3:
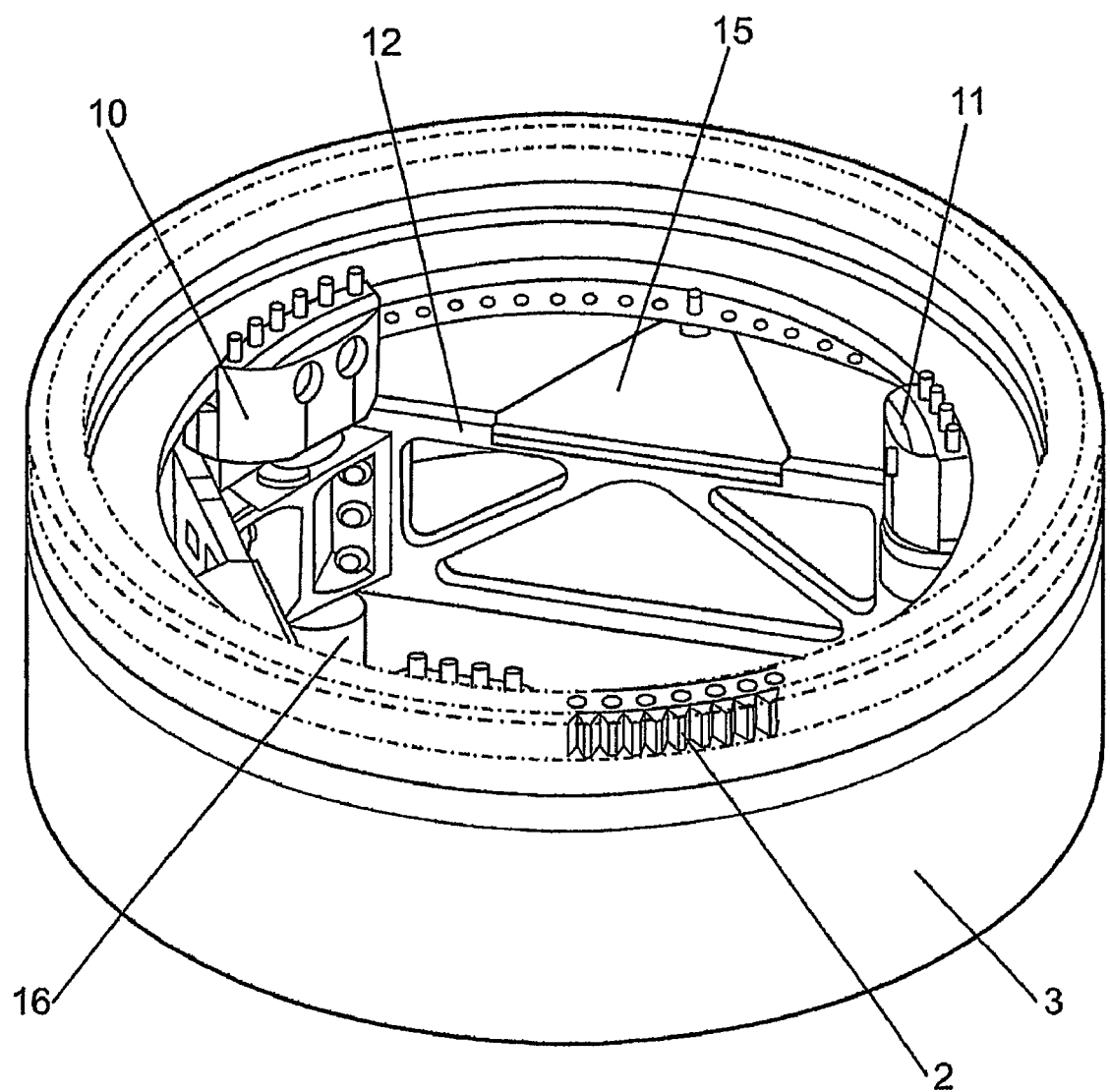
FIG. 3: General view of the rotating ring with the apparatus of this invention.

According to the embodiment shown in FIG. 3, the second fixing means consist of a rear calliper (10) which is located in place of the brake calliper (4) far away from the hub (5) of the nacelle (1). The first fixing means comprise two front callipers (11) that are located on each side of the rear calliper (10) so that the three callipers (10, 11) form an equilateral triangle.

In the event of more callipers being used (10, 11) said callipers (10, 11) will form a polygon, in a recommended regular form to facilitate the distribution of stresses.

In any event, the callipers (10, 11) must be sized to support the operating stresses for lifting and holding the nacelle (1). The position of the centre of gravity of the nacelle (1) must be taken into account, which will be moved toward the hub (5), and move from the vertical line of the rotating ring (2).

A group of beams (12), as many as the callipers used (10, 11), are secured to the top of the tower (3). These beams (12) form the same polygon as the callipers (10, 11), each of the vertices of the polygon corresponds with a calliper (10, 11).

In order to fix each beam (12) to the tower (3), the beam (12) has two plates (14), one on each end, that are joined by means of the corresponding screws or equivalent method to the base of the rotating ring (9). In order to do so, some ring screws that connect the rotating ring (2) to the tower (3) are removed to be replaced by screws that secure the plates (14). These screws may be of a length that will continue to fix the rotating ring (2) to the base of the rotating ring base (9) by passing through all three elements: plate (14), rotating ring base (9) and rotating ring (2).

The beams (12) must be located so that their ends are approximately beneath the callipers (10, 11), and in the same radial direction as the axis. In other words, the line that connects the vertex with the centre of the rotating ring (2) passes beneath the centre of the corresponding calliper (10, 11).

In order to more easily lower the callipers of the rotating system, according to another embodiment, some trays (15) can be located on the beams (12), also secured to the base of the rotating ring (9). Each tray (15) is joined at one end to the middle portion of the corresponding beam (12) and to the tower (3) at the other end by means of a fixing pin or other method.

Once the beams (12) are securely fixed to the tower (3), some supports (13) are then joined to each pair of beams (12) by any resistant method such as bolts for example, with each support (13) being located below the callipers (10, 11).

These supports (13) have vertical through holes (21) in a central position of the support (13). Through these holes (21) will pass a shaft (19) of a hydraulic jack (16, 17) secured to the bottom of the support (13) and aligned with the callipers (10, 11).

The shaft (19) will have a length that will enable the hydraulic jack (16, 17) to push the callipers (10, 11) upwards and correctly lift the nacelle (1) in order to allow maintenance or retrofitting to the rotating ring (2) and other equipment. The separation between the nacelle (1) and the rotating ring (2) will depend on the requirements. For example, a separation of 30 mm may be required in order to replace the corresponding PETP's (6, 7).

The centre of gravity of the nacelle (1), hub (5) and blade (8) unit is usually displaced from the vertical line of the rotating ring (2), therefore, the forces to be applied by each hydraulic jack (16, 17) are different.

In the event that the centre of gravity of the nacelle (1), hub (5) and blade (8) unit is located outside the polygon formed by the callipers (10,11) the front jacks (17), in other words those located closest to the hub (5), must apply a vertical force upwards, whilst the rear jacks (16), those furthest away from the hub (5), must apply a vertical retention force to prevent the nacelle (1) from overturning. To do so, said rear hydraulic jacks (16) must be double effect jacks.

In all cases the force to be applied by each individual jack (16, 17) and the direction must be studied, so that the nacelle (1) can be lifted as easily as possible, and the pressure is applied to each hydraulic jack (16, 17) depending on this force.

Figure 4:
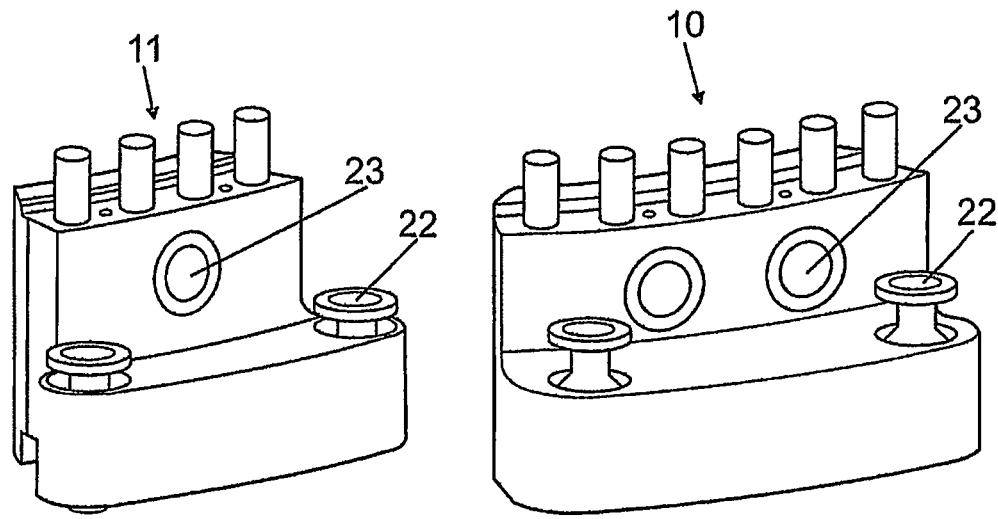
FIG. 4: General view of a front calliper and a rear calliper.
Figure 5:
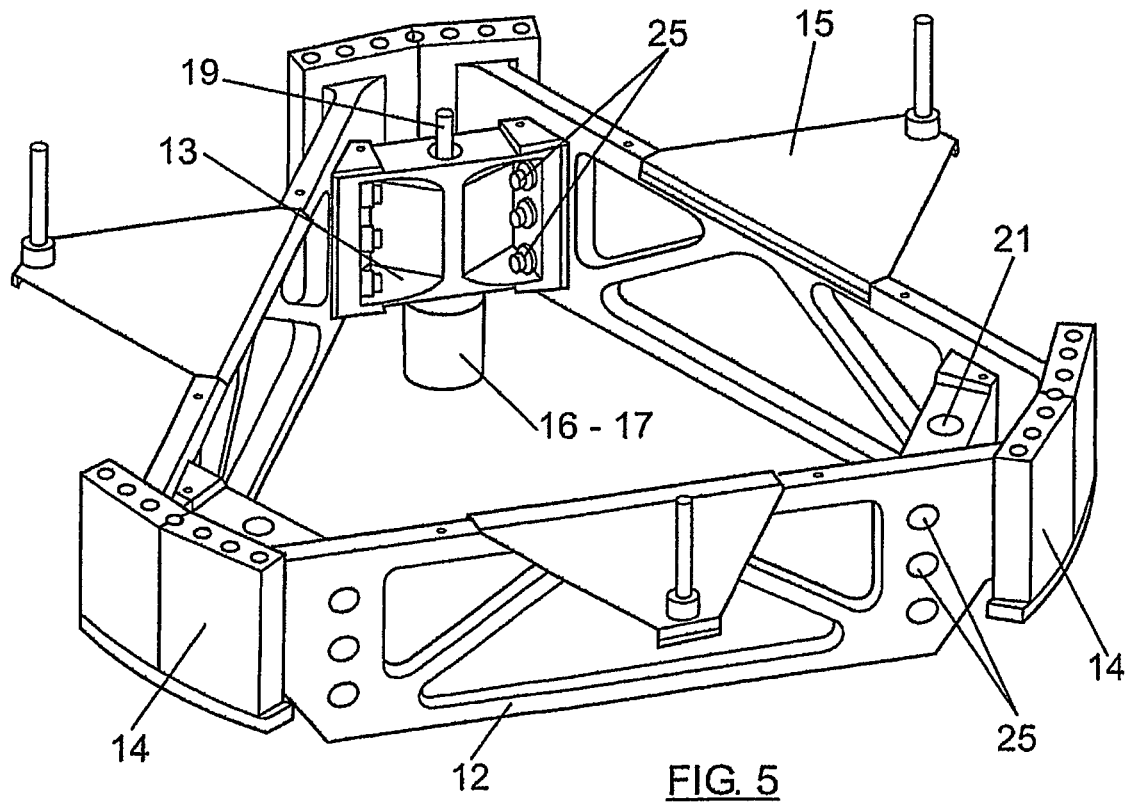
FIG. 5: Assembled unit of supports, beams, trays, plates and a hydraulic jack.

Some of the elements of the invention shown in FIGS. 4 and 5 are described in more detail below:

FIGS. 4A and 4B display two callipers (10, 11) and show that both callipers (10,11) have a similar general structure.

Each calliper (10, 11) is formed by a ring portion, with a transversal section formed by a thick L. The internal diameter of the ring is less than the internal diameter of the rotating ring (2) whilst the external diameter of the ring is greater than said internal diameter of the rotating ring (2).

The vertical section of the L is greater than the thickness of the rotating ring (2) to enable the upper part of the callipers (10, 11) to be securely fixed to the nacelle (1) and the horizontal section of the L lies below the rotating ring (2).

Two mobile vertical shims (22) are located on the horizontal section of the L in order to make contact with the bottom of the rotating ring (2) enabling relative movement between the calliper (10, 11) and rotating ring (2).

The vertical section of the L has fixing means for fixing to the nacelle (1), which in the case shown in the drawings are threaded bolts. These fixing means must be the same as those that join the brake callipers (4) to the nacelle (1).

At least one adjustable horizontal shim (23) is located on the internal wall of the vertical section of the L. This shim allows the calliper (10, 11) to be correctly adjusted to the rotating ring (2) and allows the horizontal stresses generated by the nacelle (1) to be transmitted to the rotating ring (2), whether said stresses are due to the eccentricity of the centre of gravity in relation to the tower (3), or due to the action of the wind on the hub (5).

This curved, vertical wall has a slightly lower curvature radius than the internal diameter of the rotating ring (2) whereby, to adjust this wall to the rotating ring (2) the horizontal shims (23) must be adjusted.

FIG. 5 shows a group of three beams (12) assembled to form an equilateral triangle, where a pair of plates (14) can be observed on the vertices. A triangular tray (15) is located on the middle portion of each beam (12), with a fixing pin shown in the vertices of the tray (15) furthest away from the beams (12). Said fixing pin shall be fixed to the base of the rotating ring (2).

A support (13) shall be fixed at each angle, as a brace, securely connected to each adjacent beam (12). Shown in the drawing is only one hydraulic jack (16, 17) with a shaft (19) passing through the hole (21) of one of the supports.

FIG. 5 shows how the plates (14) have a curved form of equal curvature radius as that of the base of the rotating ring (9) to facilitate its connection with fixing pins through the vertical holes located on the plates (14).

The supports (13) are securely joined to the beams (12) by means of a series of bolts (25) capable of supporting the weight of the nacelle when the shafts (19), held by the support, are lifted.

The invention also refers to a nacelle lifting method (1) applying the tool of the invention. Said method comprises the following stages:

a) Fixing of the position of the nacelle (1) to prevent it turning on itself on the rotating ring (2).

b) Removal of a brake calliper (4) located on the side opposite the wind generator hub (5), and its replacement with some fixing means, a rear calliper for example (10). This step is repeated as many times as the amount of fixing means to be located.

c) Removal of the brake callipers (4) near to the hub (5), and placement of some first fixing means, such as a rear calliper (11), as many times as the first fixing means are required (at least two), so that the first and second fixing means form the required polygon.

d) Assembly of the beams (12), which will be secured to the base of the rotating ring (2) by means of the plates (14) located at each end of the beams (12). When necessary, the pins securing the base of the rotating ring (2) to the tower (3) shall be removed for replacement with the fixing pins that secure the plates (14).

e) Assembly of the supports (13) to the beams (12) by means of bolts (25)

f) Fixing of the front hydraulic jacks (17) onto the supports (13) located beneath the first fixing means, and of the rear hydraulic jacks (16) beneath the second fixing means, and installation of the corresponding hydraulic circuit.

g) Removal of the remaining brake callipers (4).

h) Activation of the hydraulic jacks (16, 17) to lift the nacelle (1).

Once the nacelle is lifted (1) maintenance or improvement of the rotating system (2) may proceed with the replacement of the axial (6) and radial (7) PETP's, greasing, or any other necessary operation.

In order to lower the nacelle (1), the hydraulic pressure of the hydraulic jacks (16, 17) is removed (or increased depending on the case) in order for the nacelle (1) to descend under its own weight.

Once the nacelle (1) is in its correct position, the entire tool is removed following the aforementioned steps in reverse order.

To raise the different elements of the tool to rotating ring (2) height, a bridge crane or hoist such as those provided on commercial nacelles (1) for maintenance purposes, may be used.

The invention claimed is:

1. A lifting tool for a nacelle to be coupled to a wind generator which comprises:
   a rotating ring (2) supported on a tower (3);
   a nacelle (1), supporting the shaft of a hub (5);
   wherein the lifting tool comprises:
      a plurality of beams (12) fixed to a plurality of points distributed on an internal surface of the tower (3) forming a horizontal polygon;
      a plurality of supports (13) secured to the beams (12) in the vertices of the polygon as braces;
      a plurality of front and rear lifting means configured to be fixed to the supports (13);
      first nacelle (1) fixing means aligned vertically with the front lifting means and located at a higher level than the front lifting means;
      second nacelle (1) fixing means aligned vertically with the rear lifting means and located at a higher level than the front lifting means; and
      first and second fixing means moving in a vertical direction by the front and rear lifting means, in order to move the nacelle (1) in said vertical direction.

2. The nacelle lifting tool according to claim 1, wherein the front and rear lifting means comprise a plurality of front (17) and rear (16) hydraulic jacks, with said hydraulic jacks (16, 17) each having mobile vertical direction shafts (19) to lift the first and second fixing means.

3. The nacelle lifting tool according to claim 1, wherein:
   the first fixing means comprise at least two front callipers (11); and
   the second fixing means comprise at least one rear calliper (10) located in a position farther away from the hub (5) of the nacelle (1) than the first fixing means.

4. The nacelle lifting tool according to claim 1, wherein the polygon is a triangle which comprises three beams (12), three supports (13), three hydraulic jacks (16,17), two front callipers (11), and a rear calliper (10) located in the vertices of the equilateral triangle.

5. The nacelle lifting tool, according to claim 1, wherein the first and second fixing means are callipers (10, 11) that comprise a portion of a ring in an L shaped section to define a seat, that has two vertical shims (22) on a surface of the horizontal side of the seat, and means of fixing to the nacelle (1) and at least one horizontal shim (23) on the vertical side of the seat.

6. The nacelle lifting tool according to claim 1, wherein the rear lifting means are rear hydraulic jacks (16) which are double effect jacks.

7. The nacelle lifting tool according to claim 1, wherein the beams (12) include on their middle sections a plurality of trays (15) joined to the tower (3).

8. The nacelle lifting tool according to claim 1, wherein the supports (13) include, in a central position, a vertical through hole for the shaft (19) of the hydraulic jack (16,17) fixed on said support (13) to pass through.

9. A nacelle lifting method, of the type that separates a wind generator nacelle (1) that has a hub (5), a rotating ring (2), and a tower (3) upon which the rotating ring (2) is supported, with said nacelle (1) being secured by a plurality of brake callipers (4) fixed to said nacelle (1), with said method having stages that
   a) prevent the rotation of the nacelle (1) on the rotating ring (2), wherein said method also comprises the stages of:
   b) replacing at least one brake calliper (4) with second fixing means, in a position opposite the hub (5) of the wind generator;
   c) replacing at least two brake callipers (4) with first fixing means, in a manner where the brake callipers (4) replaced in stages b) and c) are distributed along the rotating ring;
   d) installing a plurality of beams (12) fixed to an internal surface of the tower (3) by means of some plates (14) located at the ends of said beams (12) forming a closed polygon, the vertices of which are radially aligned with the first and second fixing means;
   e) fixing a plurality of supports (13) as braces on each vertex of the polygon formed by the beams (12);
   f) fixing front and rear lifting means to the supports (13) whereby the front lifting means are vertically aligned with the first fixing means, and the rear lifting means are vertically aligned with the second fixing means, and
   g) removing of the remaining brake callipers (4); and
   h) acting on the lifting means, in order to lift the nacelle (1).

10. The nacelle lifting method according to claim 9, wherein the front and rear lifting means comprise a plurality of front (17) and rear (16) hydraulic jacks, with said hydraulic jacks (16,17) each having mobile vertical direction shafts (19) to lift the first and second fixing means.

11. The nacelle lifting method according to claim 10, wherein the rear hydraulic jacks (16) are double effect jacks.

12. The nacelle lifting method according to claim 9, wherein:
    the first fixing means comprise at least two front callipers (11); and
    the second fixing means comprise at least one rear calliper (10) located in a position farther away from the hub (5) of the nacelle (1) than the first fixing means.

13. The nacelle lifting method according to claim 12, wherein the callipers (10, 11) comprise a portion of a ring in an L shaped section to define a seat, that has two vertical shims (22) on a surface of the horizontal side of the seat, with means of fixing to the nacelle (1) and at least one horizontal shim (23) on the vertical side of the seat.

* * * * *